Patented Feb. 27, 1940

2,192,136

UNITED STATES PATENT OFFICE 2,192,136

DENATURANT

Hamline M. Kvalnes, Wilmington, Del., assignor to E. I. du Pont de Nemours & Company, Wilmington, Del., a corporation of Delaware No Drawing. Application May 18, 1937, Serial No. 143,295

2 Claims. (Cl. 202—77)

This invention relates to denatured alcohols and more particularly to new and improved denatured alcohol compositions of an unpotable, but at the same time scientifically and commercially utilizable, character.

It is an object of the present invention to provide a new and improved denatured alcohol composition.

Other objects and advantages of the invention will be apparent by reference to the following specification wherein the details and preferred embodiments are described.

According to the present invention a denatured ethyl alcohol is prepared containing as a denaturant a mixture of branched chain ketones and branched chain saturated and unsaturated hydrocarbons.

More specifically the denaturant of this invention comprises the product or mixture of products obtainable by catalytic dehydrogenation and/or dehydration of branched chain primary and secondary aliphatic alcohols of more than four carbon atoms per molecule to give a mixture of branched chain ketones and branched chain saturated and unsaturated hydrocarbons, said mixture boiling, preferably, in the range of about 40–200° C.

Although, according to this invention, various mixtures of branched chain ketones and branched chain saturated and unsaturated hydrocarbons obtained by dehydrogenation and dehydration of branched chain primary and secondary alcohols may be utilized as highly improved denaturants, such, for example, as those mixtures shown hereinafter in the examples, the preferred denaturant according to this invention comprises the mixture of dehydrogenation and dehydration products obtainable in and from products of the catalytic pressure hydrogenation of oxides of carbon together with the mixture of products obtainable by the catalytic pressure hydrogenation of oxides of carbon.

When oxide of carbon is subjected to catalytic hydrogenation at elevated temperatures and pressures, there results a mixture of methanol, primary and secondary alcohols of higher molecular weight, and dehydrogenation and dehydration products of such higher alcohols. This catalytic hydrogenation may be effected, for example, by passing a mixture of hydrogen and carbon monoxide, as, say, in the volume ratio of 2–1 at above two hundred atmospheres pressure and at a temperature within the range of 400–600° C., over a zinc-chromium catalyst to which purposely a small amount of alkali is added. The catalyst may be prepared by the general method described in Lazier U. S. 1,746,782. Other catalysts, as well as methods for their preparation and use in the synthesis of methanol and higher alcohols, are described in the following patents: Lazier—1,746,781; 1,746,783; 1,829,046; Larson—1,844,587; Storch—1,681,750; 1,681,752; 1,738,971; Williams Reissue 18,302.

Among the alcohols, boiling above methanol such as hereinbefore described, there have been identified normal propanol, isobutanol, pentanol-2, pentanol-3, 2-methyl pentanol-3, 2-methyl pentanol-4, 2,5-dimethyl hexanol-3, and 4-methyl pentanol-2, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1. There are present also numerous other primary and secondary alcohols containing from 5–14 carbon atoms.

When the mixture resulting from the catalytic pressure hydrogenation is subjected to distillation the mixture of methanol and dehydrogenation and dehydration products is separated from the higher boiling alcohols and the methanol and mixture of dehydrogenation and dehydration products are thereafter separable from each other by water scrubbing. It is this mixture remaining after separation of methanol therefrom which is the preferred denaturant according to the present invention. I may, however, synthesize such a product directly from suitable higher alcohols. I may also modify the preferred mixture as indicated above by selected additions of dehydration and/or dehydrogenation products of individual alcohols, or of alcohol fractions which give material having especially useful denaturing qualities. I may also use along with the dehydrogenation and dehydration products limited amounts of alcohols which lend assistance in increasing denaturing qualities.

The preferred denaturant of this invention, the mixture of dehydrogenation products and dehydration products or primary and secondary alcohols whose preparation and separation have been described above, boil in the range of about 70–160° C., are oily in character and are composed of from 90 parts ketones and 10 parts hydrocarbons to 10 parts ketones and 90 parts hydrocarbons.

It has previously been proposed to utilize various ketones as denaturing agents, but I have found that the mixture of dehydrogenation and dehydration products hereinbefore described, containing ketones but also containing substantial quantities of hydrocarbons produced during the dehydrogenation and dehydration of primary and secondary aliphatic alcohols, are unexpectedly more efficacious than the ketones and like materials heretofore proposed.

I do not wish to be limited by the explanation of the improved denaturing characteristics of my denaturant but I believe that the unsaturated and saturated hydrocarbons, of the mixture of ketones and hydrocarbons, exercise both of the two denaturing effects which are known in the denaturing art. Denaturants are known, in the art, to be substances possessing one or both of two characteristics, i. e., (1) substances which by themselves are non-potable and (2) substances which assist in preventing removal of non-potable substances. The denaturant of the present invention possesses both of these characteristics and it is my belief that both the ketones and the hydrocarbons may be characterized, individually, as possessing both the "non-potable" and "assisting" characteristics of a denaturant. It is my belief, then, that the hydrocarbons act as an azeotropic denaturant in that they assist in making difficult, if not impossible, the removal of the azeotropic mixture formed between them and the ketones.

Except for the purposes of a beverage, however, the denatured alcohol of my invention can be used for most purposes for which alcohol is suitable, the product possessing substantially the same solvent and solubility properties and fuel values.

As added advantages of my invention, my denaturant (1) is distasteful and nauseating in very small proportions in the denatured alcohol composition; (2) causes a masking or loss of ethyl alcohol taste; (3) is miscible in all proportions with alcohol; (4) leaves no objectionable residue upon evaporation; (5) is readily available and relatively inexpensive; and (6) small amounts thereof are sufficient to produce the above described effects.

The proportions of my denaturant used with alcohol may vary over a wide range, although, generally speaking, only small amounts are required, ethyl alcohol containing as little as 0.5% or even less being quite unpotable. At the same time, within certain limits, the larger the proportion of denaturant the more distasteful the product and the more difficult the separation of denaturant therefrom.

For the purposes of illustration only and not by way of limitation, the following examples are given:

*Example 1.*—10 liters of a mixture of aldehydes, ketones, unsaturated hydrocarbons and saturated hydrocarbons boiling in the range 40° C.–200° C. and obtained in the pressure synthesis of methanol from carbon monoxide and hydrogen were distilled. 4 liters boiled in the range 40° C.–80° C. and were discarded. 1% flake sodium hydroxide and an equal amount of water were added to the 80° C.–200° C. residue and the mixture refluxed 12 hours. Aldehyde was reduced to a non-corrosive concentration by this treatment. The mixture was then distilled and 4.3 liters were obtained boiling in the range 80° C.–130° C. This fraction had the following approximate composition:

| | Per cent |
|---|---|
| Ketone | 50 |
| Unsaturated hydrocarbon | 40 |
| Propyl alcohol | Trace |
| Aldehyde | 0.8 |
| Saturated hydrocarbon | Remainder |

A mixture of 100 parts pure 95% ethyl alcohol and 0.75 part of the 80° C.–130° C. fraction obtained above was distilled using a 15 theoretical plate column. The distillate was diluted to 80 proof, treated with activated carbon, and filtered. The resulting alcohol solution had a pronounced odor of the denaturant and a strong unpotable taste which persisted in the mouth after tasting the solution.

*Example 2.*—Higher alcohols, obtained in the pressure synthesis of methanol from carbon monoxide and hydrogen, and boiling in the range 160° C.–200° C., were catalytically dehydrated. The resulting mixture was distilled and a fraction boiling in the range 80°–150° C. was obtained. 30 parts of this fraction was mixed with 70 parts of a 97° C.–128° C. fraction prepared in the same manner as the 80° C.–130° C. fraction of Example 1. The resulting mixture was similar in denaturing properties to the 80° C.–130° C. fraction of Example 1.

*Example 3.*—0.5 part by volume of the mixture of ketones and saturated and unsaturated hydrocarbons prepared in Example 1 and 4.5 parts by volume of higher alcohols obtained in the pressure synthesis of methanol from carbon monoxide and hydrogen and boiling in the range 105°–195° C. were added to 100 parts by volume of pure ethyl alcohol. 300 cc. of three-fourths saturated salt solution were added to 100 cc. of the above denatured alcohol. The alcoholic brine was then shaken 2 minutes with 25 cc. of mineral oil and allowed to stand one hour. The mineral oil layer was then separated and the process repeated with a fresh 25 cc. portion of mineral oil. The alcoholic brine from the second extraction was shaken for 30 minutes with 5 grams of activated charcoal. The mixture was filtered and the filtrate was shaken another half hour with a second 5 gram portion of activated carbon. The filtrate from the second activated carbon treatment was distilled using a column of approximately 15 theoretical plates. Eight 10 cc. cuts of distillate were collected. The cuts were diluted with tap water to 50 proof and tested for odor and taste. Each of the cuts had the odor and taste of the denaturants and were considered to be unpotable. The "head" cuts were more disagreeable in taste and odor than the "tail" cuts.

Various changes may be made in the proportions of materials and in the specific fractions of alcohols and oxygen-containing organic compound mixtures which are present and/or dehydrogenated to give the denaturant utilized according to this invention, without departing from the invention or sacrificing any of the advantages thereof. Also, if desired, the denaturants hereinbefore described may be used along with other denaturants, e. g. organic nitrogen bases, methanol, acetone, kerosene, petroleum, oxidation products, terpenic bodies, halogenated organic derivatives, e. g. chlorinated phenols, etc. Thus, for example, I have found that an improved denaturant may be obtained by adding methyl alcohol and/or methyl isobutyl ketone in the proportions of 2–5 parts by weight of methyl alcohol and 1–2 parts methyl isobutyl ketone to 3–4 parts of a denaturant such as described in Example 3. From 0.5 to 8 parts of such a denaturant, although about 6 parts is preferred, will render 100 parts of ethyl alcohol completely unpotable. In like manner, as outlined above, other denaturants may be added to the denaturants of this invention.

I claim:

1. Denatured ethyl alcohol consisting of ethyl alcohol and from 0.1% to 10% by volume of a mixture consisting of branched chain ketones and branched chain saturated and unsaturated hydrocarbons boiling in the range of about 40 to 200° C., obtainable by catalytic dehydrogenation and dehydration of branched chain primary and secondary aliphatic alcohols containing more than 4 carbon atoms.

2. Denatured ethyl alcohol consisting of ethyl alcohol and from 0.5% to 5% by volume of a mixture of branched chain ketones and branched chain saturated and unsaturated hydrocarbons boiling in the range of about 80 to 130° C. and obtainable by catalytic dehydrogenation and dehydration of branched chain primary and secondary alcohols containing more than 4 carbon atoms.

HAMLINE M. KVALNES.